US012600108B2

(12) United States Patent
Heikkila

(10) Patent No.: US 12,600,108 B2
(45) Date of Patent: Apr. 14, 2026

(54) CORE AND SHELL COMPOSITE STRUCTURAL MEMBER

(71) Applicant: Tundra Composites, LLC, White Bear Lake, MN (US)

(72) Inventor: Kurt Heikkila, Marine on the St. Croix, MN (US)

( * ) Notice: Subject to any disclaimer, the term of this patent is extended or adjusted under 35 U.S.C. 154(b) by 237 days.

(21) Appl. No.: 18/392,026

(22) Filed: Dec. 21, 2023

(65) Prior Publication Data

US 2024/0217200 A1 Jul. 4, 2024

Related U.S. Application Data

(60) Provisional application No. 63/434,572, filed on Dec. 22, 2022.

(51) Int. Cl.

| | |
|---|---|
| ***B32B 3/04*** | (2006.01) |
| ***B29C 44/20*** | (2006.01) |
| ***B29C 48/00*** | (2019.01) |
| ***B29C 48/07*** | (2019.01) |
| ***B29C 48/21*** | (2019.01) |
| ***B32B 3/18*** | (2006.01) |
| ***B32B 3/30*** | (2006.01) |
| ***B32B 5/02*** | (2006.01) |
| ***B32B 5/18*** | (2006.01) |
| ***B32B 5/24*** | (2006.01) |
| *B29K 27/06* | (2006.01) |
| *B29K 105/04* | (2006.01) |
| *B29K 105/12* | (2006.01) |
| *B29K 309/08* | (2006.01) |

(52) U.S. Cl.

CPC ................ *B32B 3/04* (2013.01); *B29C 44/20* (2013.01); *B29C 48/022* (2019.02); *B29C 48/07* (2019.02); *B29C 48/21* (2019.02); *B32B 3/18* (2013.01); *B32B 3/30* (2013.01); *B32B 5/02* (2013.01); *B32B 5/18* (2013.01); *B32B 5/245* (2013.01); *B29K 2027/06* (2013.01); *B29K 2105/046* (2013.01); *B29K 2105/12* (2013.01); *B29K 2309/08* (2013.01); *B29K 2995/0063* (2013.01); *B32B 2260/021* (2013.01); *B32B 2260/046* (2013.01); *B32B 2262/0238* (2013.01); *B32B 2262/101* (2013.01); *B32B 2266/0235* (2013.01); *B32B 2266/08* (2013.01); *B32B 2266/104* (2016.11); *B32B 2307/4026* (2013.01); *B32B 2307/72* (2013.01); *B32B 2307/7376* (2023.05); *B32B 2419/00* (2013.01)

(58) Field of Classification Search

CPC .... B32B 3/04; B32B 3/18; B32B 3/30; B32B 5/02; B32B 5/18; B32B 5/245; B29C 44/20; B29C 48/022; B29C 48/07; B29C 48/21

USPC ........................................................... 428/71

See application file for complete search history.

(56) References Cited

U.S. PATENT DOCUMENTS 4,514,449 A 4/1985 Budich et al.
5,660,016 A 8/1997 Erwin et al.
5,713,165 A 2/1998 Erwin (Continued)

FOREIGN PATENT DOCUMENTS

WO WO-2016185179 A1 * 11/2016 ............... B32B 5/02

*Primary Examiner* — Tahseen Khan

(74) *Attorney, Agent, or Firm* — Mark DiPietro; Fred Morgan

(57) ABSTRACT

A core shell structural member. A core/shell composite structural member comprising a shell comprising a fiber and a polymer used to surround a foamed polymer core.

9 Claims, 2 Drawing Sheets

(56) References Cited

U.S. PATENT DOCUMENTS

Figure 1:
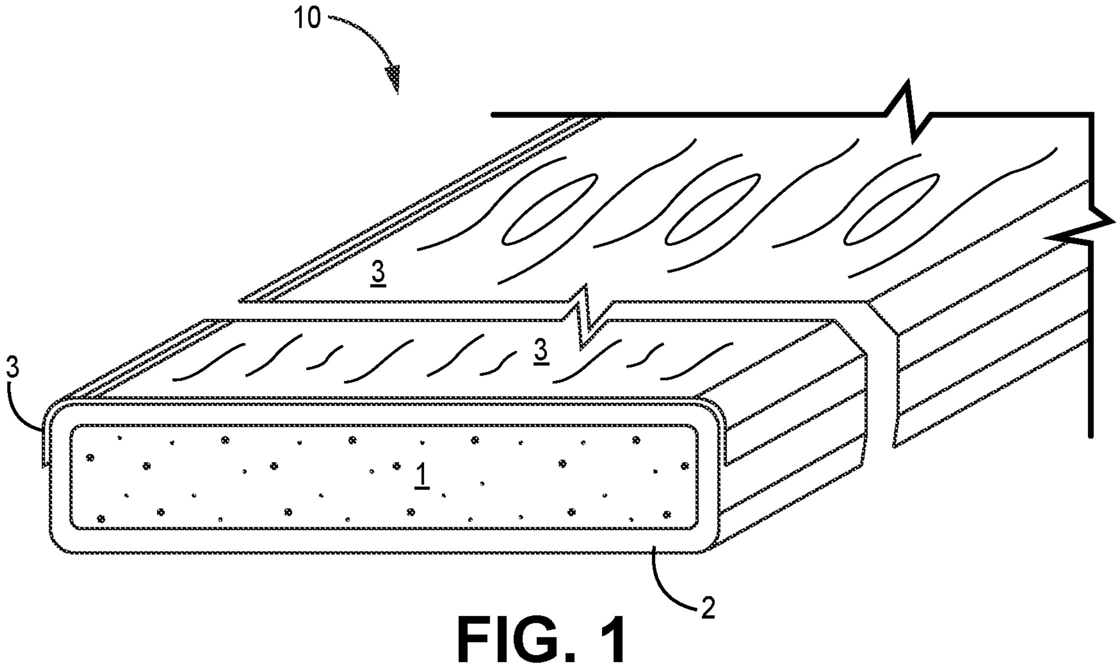

| | | | |
|---|---|---|---|
| 6,009,682 | A | 1/2000 | Lehman et al. |
| 6,893,594 | B2 | 5/2005 | Chen |
| 2016/0264218 | A1 * | 9/2016 | Balester .................. B63B 32/66 |
| 2024/0262466 | A1 * | 8/2024 | Ciappa ...................... B32B 3/10 |

* cited by examiner

CORE AND SHELL COMPOSITE STRUCTURAL MEMBER

CROSS REFERENCE TO RELATED APPLICATIONS

This application claims the benefit of Provisional Patent Application 63/434,572 filed Dec. 22, 2022. This application is hereby incorporated by reference in its entirety.

FIELD

A core/shell composite structural member comprising a shell comprising a fiber and a polymer used to surround a foamed polymer core.

BACKGROUND OF THE INVENTION

Substantial attention has been paid to the creation of composite materials with unique properties. Fiber reinforced polymer materials such as glass reinforced (GFR) polyvinyl chloride (PVC) have been developed for a variety of end uses. Developing such materials have faced difficult barriers. To obtain significant modulus properties, a composite needs to maximize the reinforcing fiber loading. Highly filled composite materials cannot be easily made without thermal depolymerization of the polymer and accompanying hazards of fire and toxic gases. In the past the polymers have been stabilized using additive materials. Without improved modulus, glass fiber reinforced (GFR) composites are not fully suited to many demanding structural end uses. Rahrig et al., U.S. Pat. No. 4,801,627 and Kenson et al., U.S. Pat. No. 5,008,145 teaches that useful GFR is made by combining glass fiber, polyvinyl chloride, a reactive coupler (binder of fiber to polymer), and a stabilizer to prevent dehydrohalogenation. Lee et al. U.S. Pat. No. 7,198,840 discloses a profile extruded article made of fiber reinforced polymer of vinyl-chloride monomer with amino coupling agents and other additives. Beshay U.S. Pat. No. 5,152,341 discloses cellulose fiber composites. D'Souza US Pat Pub 2005/0238864 discloses glass bubble composites that can contain some fiber. The glass fiber and other fiber composites, while disclosing high fiber loadings, have not been able to achieve much greater than 50 vol. % fiber and are commonly less than 30 vol. % in polymer composite materials.

The term "Celuka PVC" involves a known method and product made by extruding a foam progenitor and cooling the foam to near room temperature. A PVC melt containing chemical blowing agents is passed through a hollow die. As the extrudate exits the die, the outer surface of the extrudate is cooled taking excess time. The cooled foam is then enclosed in a shell.

One of the limiting factors to achieving fast profile extrusion rates is cooling the profile enough that it can withstand the compressive forces imposed by the puller without distorting and/or the profile losing its shape. Foamed extrusion processes exacerbate this fact because the foam has a lower thermal conductivity than solid material and thus it takes longer (slower line speeds) to cool the profile sufficiently to enable structural characteristics for the puller. By using a fiber-reinforced composite as the shell, we extrude a profile that is structurally capable of withstanding the compressive forces of the puller without having to cool the entire profile before it encounters the puller. Cooling of the entire profile thickness can be accomplished off-line where it does not become the limiting factor in the extrusion process.

While a substantial amount of work has been done in producing structural articles, a substantial need exists for a composite that can be made successfully.

SUMMARY OF THE INVENTION

The claimed structural member comprises a foamed core with a shell substantially surrounding the foam core. The foam core comprises a polyvinyl chloride foam made from a relatively low K value vinyl chloride and a foaming agent to produce a low-density foam with a small foam bubble diameter. The shell comprises a PVC fiber composite having about 50 to about 85 weight percent PVC and about 10 to about 50 weight percent fiber. The shell PVC has a relatively high K value polymer. The structural member is manufactured by introducing to a heated extruder, a low K value (55-60) polyvinyl chloride, and the foaming agent, along with process aids, extrusion lubricating waxes and pigments at a rate such that the foam can expand and be shaped by the extruder. Dies are designed such that the foam mixture is kept under pressure (and gases remain in polymer solution) until the die exit/first calibrator entrance, where foam expansion is desired forming the core member. Extruding a PVC fiber polymer with a K value of 61 to 70 surround the core structure. The formed structural member is immediately placed into a cooling environment such that the shell forms a stiff rigid structural exterior layer, with sufficient thickness and modulus such that it will maintain the shape of the structural member once surface cooled while the core is warm. The selection of the amounts of PVC and fiber and the high K value of the polymer, when combined with the foam manufactured with a low K value, polyvinyl chloride into a foam with a specified density foam bubble diameter, and specified ratio of core to shell, provides a structural member that can be rapidly and efficiently produced, yet provide high quality structural properties to the product.

As used in this disclosure the term "fiber" means a fibrous material input to a compounding process unit. The fiber material has a cross-section dimension (preferably but not limited to a diameter) of at least about 0.8 micron often about 1-150 microns and can be 2-2000 microns a length of 0.1-150 mm, often 0.2-100 mm, and often 0.3-20 mm and can have an aspect ratio of at least 25 often about 10-1500. These aspect ratios are typical if the input is to the compounder. After pellets are formed the aspect ratio is set by the pellet dimensions. Fiber as used in a discontinuous phase can be free of a particle or particulate.

Particle, or a collection of particles known as a particulate, is a discrete object having a particle size about 0.1-500 microns, an aspect ratio of less than 5 and a circularity (circularity, is measured by a view of the two-dimensional projection of a particle and is equal to $(\text{perimeter})^2/\text{area}$) is less than 20.

The term "continuous phase" means the polymer matrix into which the fiber is dispersed during compounding.

The term "discontinuous phase" means the set of individual fibers that are individually dispersed throughout the continuous phase.

The term "interfacial modifier" means a material that can coat the surface of fiber and does not react with the polymer or other fiber present in the composite after coating. In one embodiment the interfacial modifier material is an organometallic material.

The term "K" value is an empirical parameter closely related to intrinsic viscosity, often defined in slightly different ways in different industries to express viscosity-based estimate of statistical molecular mass of polymeric material used particularly for PVC. A PVC polymer having the K-value in the range of 70-61 is used largely for rigid PVC applications like films, pipe fittings, bottles etc. K-value in the range of 60-55 is used mainly for plasticized applications, like cables, footwear, hoses, soft films etc. whereas rigid formulations are recommended for rigid PVC pipes, profiles, films etc. The interfacial modifier material that can coat the surface of fiber and does not react with the polymer or other fiber present in the composite after coating. In one embodiment the interfacial modifier material is an organometallic material.

BRIEF DISCUSSION OF THE DRAWINGS

Figure 2:
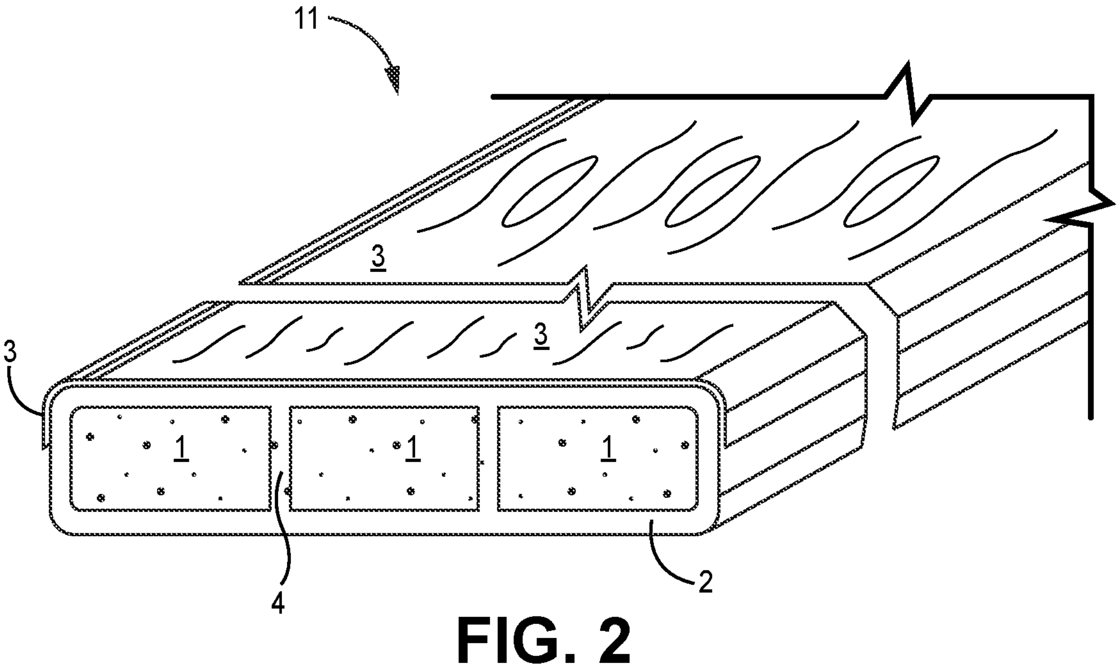
Figure 3:
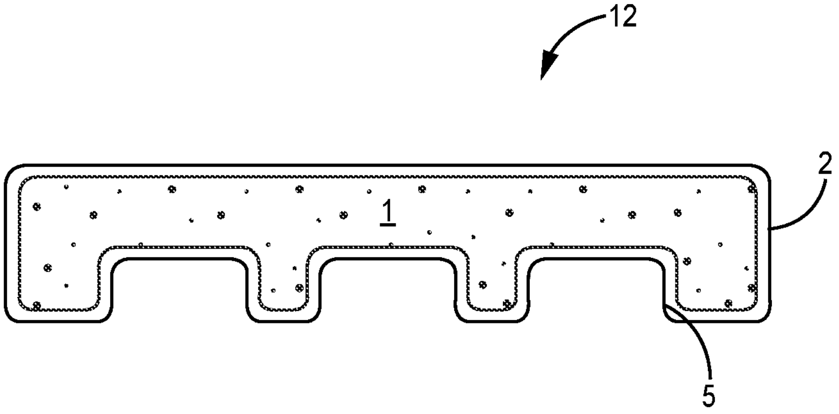

FIGS. 1, 2 and 3 are various views of different aspects of the core shell structure as disclosed or claimed.

DETAILED DESCRIPTION OF THE INVENTION

The structural member, as claimed, comprises a foamed core surrounded by a polymer composite shell. The shell comprises a polymer fiber composite having a specified amount of polymer and fiber in a relatively high K value composite. The core comprises a polymer foam made by combining PVC, polymer processing aids, extrusion lubricating waxes, blowing agents, and pigments to form a core having a defined density foam bubble diameter.

These materials are used in a structural member that can comprise a rectangular cross-section structural member, a decking, a structural member having a decking profile, or in a more complex profile used in a fenestration, window, or door component. By a careful selection of the nature of the shell materials and the core foam core, controlling the weight ratio of the shell material to the core material and the dimensions of these materials. A structural member having substantial thickness, high protectivity, and ease of manufacturer can be made in a continuous extrusion process.

Core/Shell

The claimed structure comprises a thin, compared to the core, shell surrounding a thermoplastic foamed core. The claimed structure can contain one section of foam, two sections of foam, three or four or more sections of foam isolated by separator components of the shell, resulting in two, three, four or more discrete core sections surrounded by shell. The thickness of the shell component must be greater than about 0.5 or 0.7 millimeters and can be about 0.8 to 3 millimeters or 0.9 to 2.5 millimeters. The exterior of the shell can have a uniform thickness and can be the same or different than the separator portions of the shell.

The overall dimensions of one or more of the foamed core components can have a a width of about 5 to 30 centimeters and a thickness of about 1 to 3 centimeters. The length of the overall core shell structure can be appropriate for the types of applications discussed herein. Often, the length of the core shell structure can be 30 cm or greater, can be from about 1.8 meters to about 6 meters feet in length, or can be indeterminate length when formed in situ.

Core Foam

The core foaming composition comprises a PVC having a K (molecular weight comparator) value of about 50 to 63 substantially different from the shell PVC. The PVC is combined with a foaming agent. An agent is selected to form a foam with a density of 0.1 to 1 g-cm$^{-3}$, with a foam bubble size less than 10 microns. Smaller foam diameters substantially improve structural properties and fastener retention. The foaming composition can also contain process aids waxes and pigments. Blowing agents used to make the structural member include azodicarbonamide, p,p'-oxy(benzene sulfonyl hydrazide, p-toluene sulfonyl hydrazide, zinc di-toluene sulfinate, and p-toluene sulfonyl semi-carbazide. Useful agents produce large amounts of gas in small foam bubbles with a diameter of less than 10 microns, when foamed. Basic foaming promoters can be used such as sodium bicarbonate $NaHCO_3$, zinc oxide (ZnO) azodicarbonamide, and others. Other PVC compatible components can be used such as process aids, stabilizers, waxy lubricants, pigments, and extenders. Such components can be used with PVC such as an antioxidant of 0.1 to 3.0 part by weight, a heat/UV stabilizer of 0.1 to 2.0 part by weight, pigment/coloring agent of 0.1 to 5.0 part by weight, lubricant of 0.1 to 30 part by weight and filler of 0.1 to 100 part by weight.

Shell

The shell is a glass fiber PVC composite. Fiber is typically coated with an interfacial surface chemical treatment also called an interfacial modifier (IM) that supports or enhances the final structural properties of the composite. These properties are not present in contemporary composite materials.

Useful vinyl chloride polymers used in preparing the compositions include the homopolymer of vinyl chloride, i.e., polyvinyl chloride, and copolymers of vinyl chloride with mono-ethylenically unsaturated monomers wherein the copolymer contains at least about 80 percent of the vinyl chloride units. The materials to be copolymerized with vinyl chloride include, but are not restricted to vinyl acetate, vinylidene chloride, diethyl fumarate, methyl methacrylate, meth acrylonitrile, acrylonitrile, styrene, allyl alcohol, ethyl vinyl succinate, allyl ethyl phthalate, vinyl benzoate, allyl acetate, and the like and mixtures thereof. Particularly preferred starting materials comprise polyvinyl chloride and copolymers thereof, vinyl chloride with ethylenically unsaturated esters, vinylidene chloride with styrene and acrylonitrile.

Useful fiber includes both natural and synthetic fibers. Natural fiber includes those of animal or plant origin. Plant based examples include cellulosic materials such as wood fiber, cotton, flax, jute, cellulose acetate etc.; animal-based materials made of protein include wool, silk etc. Synthetic fibers include polymer materials such as acrylic, aramid, amide-imide, nylon, polyolefin, polyester, polyurethane, carbon, etc. Other types include glass, metal, or ceramic fibers. Metallic fibers are manufactured fibers of metal, metal coated plastic, or a core completely covered by metal. Non-limiting examples of such metal fibers include gold, silver, aluminum, stainless steel, and copper. The metal fibers may be used alone or in combinations.

The determinant for the selection metal fiber is dependent on the properties desired in the composite material or the shaped article made therefrom. One useful fiber comprises a glass fiber known by the designations: A, C, D, E, Zero Boron E, ECR, AR, R, S, S-2, N, and the like. Generally, any glass that can be made into fibers either by drawing processes used for making reinforcement fibers or spinning processes used for making thermal insulation fibers. Such fiber is typically used as a length of about 0.8-100 mm often about 2-100 mm, a diameter about 0.8-100 microns and an aspect ratio (length divided by diameter) greater than 90 or about 100 to 1500. These commercially available fibers are often combined with a sizing coating. Such coatings cause the otherwise ionically neutral glass fibers to form and remain in bundles or fiber aggregates. Sizing coatings are applied during manufacture before gathering. The sizing minimizes filament degradation caused by filament-to-filament abrasion. Sizings can be lubricants, protective, or reactive couplers but do not contribute to the properties of a composite using an interfacial modifier coating on the fiber surface.

In application of an interfacial modifier coating, dipole structures arise by the separation of charges on a molecule creating a generally or partially positive and a generally or partially negative opposite end. The forces arise from electrostatic interaction between the molecule negative and positive regions. Hydrogen bonding is a dipole-dipole interaction between a hydrogen atom and an electronegative region in a molecule, typically comprising oxygen, fluorine, nitrogen or other relatively electronegative (compared to H) site. These atoms attain a dipole negative charge attracting a dipole-dipole interaction with a hydrogen atom having a positive charge.

Dispersion force is the van der Waals' force existing between substantially non-polar uncharged molecules. While this force occurs in non-polar molecules, the force arises from the movement of electrons within the molecule. Because of the rapidity of motion within the electron cloud, the non-polar molecule attains a small but meaningful instantaneous charge as electron movement causes a temporary change in the polarization of the molecule. These minor fluctuations in charge result in the dispersion portion of the van der Waals' force.

Such VDW forces, because of the nature of the dipole or the fluctuating polarization of the molecule, tend to be low in bond strength, typically 50 KJ $mol^{-1}$ or less. Further, the range at which the force becomes attractive is also substantially greater than ionic or covalent bonding and tends to be about 3-10 Å.

In the van der Waals composite materials, we have found that the unique combination of fiber, the varying but controlled size and aspect ratio of the fiber component, the modification of the interaction between the fiber and the polymer, result in the creation of a unique van der Waals' bonding. The van der Waals' forces arise between atoms/crystals and are created by the combination of fiber size, polymer, and interfacial modifiers in the composite.

In the past, materials that are often characterized as "composite" merely comprised a polymer filled with particulate with little or no van der Waals' interaction between the particulate filler material. The interaction between the selection of fiber size distribution and interfacially modified fiber enables the fiber to achieve an intermolecular distance that creates a substantial van der Waals' bond strength. The reference materials having little viscoelastic properties, do not achieve a true composite structure. This leads us to conclude that this intermolecular distance was not attained in the prior art.

In the discussion above, the term "molecule" can be used to relate to a fiber, a fiber comprising non-metal crystal or an amorphous aggregate, other molecular or atomic units or sub-units of non-metal or inorganic mixtures. The van der Waals' forces occur between collections of metal atoms, embodiments of the interfacial modifier, which act as "molecules".

Modified VDW force is characterized in a composite having intermolecular forces between fibers about 30 kJ-$mol^{-1}$ and a bond dimension of 3-10 Å. The fiber in the composite, the reinforcement, is usually much stronger and stiffer than the matrix, and gives the composite its good properties in, for example a shaped article, structural member, or other end use. The matrix holds the reinforcements in an orderly high-density pattern. Because the reinforcements are usually discontinuous, the matrix also helps to transfer load among the reinforcements.

Processing can aid in the mixing and filling of the reinforcement or fiber. To aid in the mixture, an interfacial modifier can help to overcome the forces that prevent the matrix from forming a substantially continuous phase of the composite. The composite properties arise from the intimate association of interfacially modified fiber and polymer obtained by use of careful processing and manufacture.

Novel composites are made by combining an interfacial modified fiber and a polymer to achieve novel physical and process properties. Interfacial modifiers used in the application fall into broad categories including Group IIIA, or Group VIB element compounds, for example, titanate compounds, zirconate compounds, hafnium compounds, samarium compounds, strontium compounds, neodymium compounds, yttrium compounds, phosphonate compounds, aluminate compounds and zinc compounds. Aluminates, boronates, phosphonates, titanates and zirconates that are useful contain ligands comprising hydrocarbyl phosphate esters and/or hydrocarbyl sulfonate esters and ligands which may further contain unsaturation and heteroatoms such as oxygen, nitrogen, and sulfur In one embodiment, the interfacial modifier that can be used is a type of organo-metallic material such as organo-cobalt, organo-iron, organo-boron, organo-nickel, organo-titanate, organo-aluminate, organo-strontium, organo-neodymium, organo-yttrium, organo-zinc, or organo-zirconate. The specific type of organo-titanate, organo-aluminates, organo-boronate, organo-strontium, organo-neodymium, organo-yttrium, organo-zirconates which can be used, and which can be referred to as organo-metallic compounds are distinguished by the presence of at least one hydrolysable group and at least one organic moiety. Mixtures of organo-metallic materials may be used.

Certain of these types of compounds may be defined by the following general formula:

$$M\,(R_1)_n(R_2)_m$$

wherein M is a central atom selected from such metals as, for example, Ti, Al, and Zr and other metal centers; $R_1$ is a hydrolysable group; $R_2$ is a group consisting of an organic moiety, preferably an organic group that is non-reactive with polymer or other film former; wherein the sum of m+n must equal the coordination number of the central atom and where n is an integer ≥1 and m is an integer ≥1. Particularly $R_1$ is an alkoxy group having less than 12 carbon atoms. Other useful groups are those alkoxy groups, which have less than 6 carbons, and alkoxy groups having 1-3 C atoms. $R_2$ is an organic group including between 6-30, preferably 10-24 carbon atoms optionally including one or more hetero atoms selected from the group consisting of N, O, S and P. $R_2$ is a group consisting of an organic moiety, which is not easily hydrolyzed and is often lipophilic and can be a chain of an alkyl, ether, ester, phosphato-alkyl, phosphato-alkyl, phosphato-lipid, or phosphato-amine. The phosphorus may be present as phosphate, pyrophosphato, or phosphito groups. Furthermore, $R_2$ may be linear, branched, cyclic, or aromatic. $R_2$ is substantially unreactive, i.e., not providing attachment or bonding, to other particles. Titanates provide antioxidant properties and can modify or control cure chemistry. A titanate material can be 2-propanolato, tris iso-octa-decanato-O-titanium IV, an isopropyl tri-isostearoyl titanate. Zirconate provides excellent coating and reduces formation of off color in formulated thermoplastic materials. A useful zirconate material is neopentyl (diallyl) oxy-tri (dioctyl) phosphato-zirconate.

The use of an interfacial modifier results in workable viscosity and improved structural properties in a final use such as a structural member or shaped article. Minimal amounts of the modifier can be used including about 0.005 to 10 wt.-%, about 0.01 to 8 wt.-%, about 0.05 to 6 wt.-%, or about 0.04 to 2 wt. % based on the weight final retroreflective composite.

The IM coating, with no other components, can be formed as a coating of a dimension equal to at least 3 molecular layers of IM. A substantially complete IM coating has a thickness of less than 1500 Angstroms often less than 200 Angstroms, and commonly 100 to 5000 Angstroms (Å) 50 to 1000 Angstroms (Å) or 10 to 500 Angstroms (Å).

The benefit of interfacial modification on a fully coated fiber is independent of overall fiber shape. The current upper limit constraint is associated with challenges of successful dispersion of fibers within laboratory compounding equipment without significantly damaging the high aspect ratio fibers. Furthermore, inherent rheological challenges are associated with high aspect ratio fibers. With proper engineering, the ability to successfully compound and produce interfacially modified fibers of fiber fragments with aspect ratio more than 20 often more than 100, 200 or more is provided.

Application of Interfacial Modifier:

To interfacially modify at a lab scale, the interfacial modifier is first solubilized with a solvent such as IPA. The solvent/modifier mixture is applied to a fiber portion previously placed within a preparation vessel. The solvent/modifier mixture is added in enough volume to fully wet and flood the fiber. The outer part of vessel is then heated to volatize the solvent. After a sufficient time, the modified fiber becomes free flowing—an indication that they are ready for compounding and thermoplastic processing. The extruded or injection molded member can be formed as a linear member or a hollow profile.

The improved process viscosity can be seen in comparing the processing of a composite as claimed compared to a composite of uncoated fiber. The claimed materials have substantially reduced processing viscosity that is derived from the freedom of movement of the interfacially modified fiber within the polymer matrix. The IM also provides some fiber self-ordering which increases fiber packing fraction without the loss of rheology or breakage of fibers.

We used a C. W. Brabender Computerized Plasti-Corder test mixer equipped with a 19.1 mm. (¾ in.) diameter extruder with a 25/1 length/diameter ratio. The extrusion screw had ten feed flights, 10 compression flights with a compression ratio of 3:1, and 5 metering flights. Operating parameters were controlled by 5 independent heating zones, four pressure transducers and a torque-measuring drive unit. Software module was used for extrusion data. The capillary die, made from #416 stainless steel, had a diameter of 2 mm and a length of 40 mm. In operation, the operating conditions were set, and the fiber polymer composite was then extruded until equilibrium (constant throughput and constant die pressure) were reached. Extrusion at 40 rpm and a die pressure of about 28 Mpa were used. Brabender viscosity is reported as torque according to the appropriate ASTM protocol in N-m.

The linear member can be in the form of dimensioned lumber, trim pieces, circular cross-section rod, I-beam, etc. The profile comprises an exterior wall or shell substantially enclosing a hollow interior. The interior can contain structural web providing support for the walls and can contain one fastener anchor.

For composites containing high volumetric loading of fibers, the rheological behavior of the highly packed composites depends on the characteristics of the contact points between the fibers and the distance between fibers. When forming composites with polymeric volumes approximately equal to the excluded volume of the discontinuous phase, inter-fiber interaction dominates the behavior of the material. Fibers contact one another and the combination of interacting sharp edges, soft surfaces (resulting in gouging) and the lack of friction between the surfaces prevent further or optimal packing.

Interfacial modifying chemistries can alter the surface of the fiber by coordination bonding, Van der Waals forces, or a combination of all three. The surface of the interfacially modified fiber behaves as a fiber formed of the non-reacted end or non-reacting end of the interfacial modifier. The coating of the interfacial modifier improves particle wetting by the polymer and as a result improves the physical association of the fiber and polymer in the formed composite leading to improved physical properties including, but not limited to, increased tensile and flexural strength, increased tensile and flexural modulus, improved notched IZOD impact and reduced coefficient of thermal expansion. In the melt, the interfacial modified coating on the fiber reduces the friction between fibers thereby preventing gouging and allowing for greater freedom of movement between fibers in contrast to fibers that have not been coated with interfacial modifier chemistry. As a result, the composite can be thermoplastically processed at greater productivity and at conditions of reduced temperature and pressure severity. The process and physical property benefits of utilizing the coated fibers in the acceptable fiber morphology index range does not become evident until packing to a significant proportion of the maximum packing fraction; this value is typically greater than approximately 40, 50, 60, 70, 80, 90, 92 or 95 volume or 10, 15, 20, 25, 30, 35, 40, 45, or 50 weight % of the fiber phase in the composite.

In a composite, the fiber is usually much stronger and stiffer than the polymer matrix and gives the composite its designed structural or shaped article properties. The matrix holds the fiber in an orderly high-density pattern. Because the fibers are usually discontinuous, the matrix also helps to transfer load among the non-metal, inorganic, synthetic, natural, or mineral fibers. Processing can aid in the mixing and filling of the non-metal, inorganic or mineral fibers. To aid in the mixture, an interfacial modifier can help to overcome the forces that prevent the matrix from forming a substantially continuous phase of the composite. The tunable composite properties arise from the intimate association of the fiber and the polymer obtained using careful polymer processing and manufacture. We believe an interfacial modifier (IM) is an organic material that provides an exterior coating on the fiber promoting the close association, but no bonding, of polymer and fiber. Minimal amounts of the interfacial modifier can be used including about 0.005 to 8 wt.-%, 0.01 to 6 wt. % or about 0.02 to 3 wt. %. Higher amounts of the IM are used to coat materials with increased surface morphology.

Typically, composite materials can be manufactured using melt processing and are also utilized in product formation using melt processing. A typical thermoplastic polymer material is combined with fiber and processed until the material attains (e.g.) a uniform density (if density is the characteristic used as a determinant). Alternatively, in the manufacture of the material, the fiber or thermoplastic polymer may be blended with interfacial modification agents and the modified materials can then be melt processed into the material. Once the material attains a sufficient property, such as, for example, density, the material can be extruded into a product or into a raw material in the form of a pellet, chip, wafer, preform or other easily processed material using conventional processing techniques.

In the manufacture of useful products, the manufactured composite can be obtained in appropriate amounts, subjected to heat and pressure, typically in extruder useful for 3D printing (additive manufacturing), or injection molding equipment and then formed into an appropriate shape having the correct number of materials in the appropriate physical configuration.

In the appropriate product design, during composite manufacture or during product or article manufacture, a pigment or other dye material can be added to the processing equipment. One advantage of this material is that an inorganic dye or pigment can be co-processed resulting in a material that needs no exterior painting or coating to obtain an attractive, functional, or decorative appearance. The pigments can be included in the polymer blend, can be uniformly distributed throughout the material, and can result in a surface that cannot chip, scar, or lose its decorative appearance. One particularly important pigment material comprises titanium dioxide ($TiO_2$). This material is extremely non-toxic, is a bright white particulate that can be easily combined with the fiber and/or polymer composites to enhance the novel characteristics of the composite material and to provide a white hue to the ultimate composite material.

The manufacture of composite materials depends on good manufacturing techniques. The fiber is initially treated with an interfacial modifier by contacting the fiber with the modifier in the form of a solution of interfacial modifier on the fiber with blending and drying carefully to ensure uniform particulate or fiber coating with the interfacial modifier. Interfacial modifier can also be added to fibers in bulk blending operations using high intensity Littleford or Henschel blenders. Alternatively, twin cone mixers can be followed by drying or direct addition to a screw compounding device. Interfacial modifiers may also be reacted with the particulate in aprotic solvent such as toluene, tetrahydrofuran, mineral spirits, or other such known solvents.

The particulate can be combined into the polymer phase depending on the nature of the polymer phase, the filler, the particulate surface chemistry and any pigment process aid or additive present in the composite material. Titanates provide antioxidant properties and can modify or control cure chemistry.

The composite materials having the desired physical properties can be manufactured as follows. In an embodiment, the surface of the fiber is initially prepared, the interfacial modifier coats the fiber, and the resulting product is isolated and then combined with the continuous polymer phase to affect an immiscible dispersion or association between the fiber and the polymer. Once the composite material is compounded or prepared, it is then thermoplastically formed into the desired shape of the end use article. Solution processing is an alternative that provides solvent recovery during materials processing. The materials can also be dry blended without solvent. Blending systems such as ribbon blenders obtained from Drais Systems, high-density drive blenders available from Littleford Brothers and Henschel are possible. Further melt blending using Banberry, other single screw or twin-screw compounders is also useful. When the materials are processed as a plastisol or organosol with solvent, liquid ingredients are generally charged to a processing unit first, followed by polymer, particulate and rapid agitation. Once all materials are added a vacuum can be applied to remove residual air and solvent, and mixing is continued until the product is uniform and high in density.

Dry blending is generally preferred due to advantages in cost. However certain embodiments can be compositionally unstable due to differences in fiber size. In dry blending processes, the composite can be made by first introducing the polymer, combining the polymer stabilizers, if necessary, at a temperature from about ambient to about 60° C. with the polymer, blending a particulate (modified if necessary) with the stabilized polymer, blending other process aids, interfacial modifier, colorants, indicators or lubricants followed by mixing in hot mix, transfer to storage, packaging or end use manufacture.

Useful volume % of the fiber phase in the composite of the invention can be adjusted to above 40, 50, 60, 70, 80, or 90%, depending on the end use of the article or structural member and the required physical properties of the article or structural member, without loss of processability, viscoelasticity, rheology, high packing fraction, and fiber surface inertness of the composite.

TABLE 1

Shell PVC composite

| Component | Useful amounts wt. % | Useful amounts wt. % | Useful amounts wt. % |
|---|---|---|---|
| PVC | 50-90 | 55-85 | 60-80 |
| Fiber | 10-50 | 8-48 | 7-45 |
| IM | 0.5-2.5 | 0.7-2 | 0.8-1.9 |

TABLE 2

Core foaming composition

| Component | Parts per hundred parts | Parts per hundred parts | Parts per hundred parts |
|---|---|---|---|
| PVC | Basis 100 | Basis 100 | Basis 100 |
| Process aid | 0 | 5 to 15 | 6 to 12 |
| Process wax | 0 | 0.1 to 5 | 0.2 to 3 |
| Blowing agent | 0.1 to 5 | 0.5 to 4 | 1 to 4 |
| Pigment | 0 | 1 to 10 | 2 to 8 |

The interior of the structural member is commonly provided with one or more structural webs which in a direction of applied stress supports the structure. Structural web typically comprises a wall, post, support member, or other formed structural element which increases compressive strength, torsion strength, or other structural or mechanical properties. Such structural web connects the adjacent or opposing surfaces of the interior of the structural member. More than one structural web can be placed to carry stress from surface to surface at the locations of the application of stress to protect the structural member from crushing, torsional failure, or general breakage. Typically, such support webs are extruded, or injection molded during the manufacture of the structural material. However, support can be added from parts made during separate manufacturing operations.

The internal space of the structural member can also contain a fastener anchor or fastener installation support. Such an anchor or support means provides a locus for the introduction of a screw, nail, bolt, or other fastener used in either assembling the unit or anchoring the unit to a rough opening in the commercial or residential structure.

The anchor web typically is conformed to adapt itself to the geometry of the anchor and can simply comprise an angular opening in a formed composite structure, can comprise opposing surfaces having a gap or valley approximately equal to the screw thickness, can be geometrically formed to match a key or other lock mechanism, or can take the form of any commonly available automatic fastener means available to the window manufacturer from fastener or anchor parts manufactured by companies such as Amerock Corp., Illinois Tool Works, and others.

The structural member can have premolded paths or paths machined into the molded thermoplastic composite for passage of door or window units, fasteners such as screws, nails, etc. Such paths can be counter sunk, metal lined, or otherwise adapted to the geometry or the composition of the fastener materials. The structural member can have mating surfaces premolded to provide rapid assembly with another window. Components of similar or different compositions have similarly adapted mating surfaces. Further, the structural member can have mating surfaces formed in the shell of the structural member adapted to moveable window sash or door sash or other moveable parts used in window operations.

The structural member can have a mating surface adapted for the attachment of the subfloor or base, framing studs or side molding or beam, top portion of the structural member to the rough opening. Such a mating surface can be flat or can have a geometry designed to permit easy installation, sufficient support, and attachment to the rough opening. The structural member shell can have other surfaces adapted to an exterior trim and interior mating with wood trim pieces and other surfaces formed into the exposed sides of the structural member adapted to the installation of metal runners, wood trim parts, door runner supports, or other metal, plastic, or wood members commonly used in the assembly of windows and doors.

The structural members can be assembled with a variety of known mechanical fastener techniques. Such techniques include screws, nails, and other hardware. The structural members can also be joined by an insert into the hollow profile, glue, or a melt fusing technique wherein a fused weld is formed at a joint between two structural members.

The structural members can be cut or milled to form conventional mating surfaces including 90° angle joints, rabbit joints, tongue and groove joints, butt joints, etc. Such joints can be bonded using an insert placed into the hollow profile that is hidden when joinery is complete. Such an insert can be glued or thermally welded into place. The insert can be injection molded or formed from similar thermoplastics and can have a service adapted for compression fitting and secure attachment to the structural member. Such an insert can project from approximately 1 to 5 inches into the hollow interior of the structural member. The insert can be shaped to form a 90° angle, a 180° extension, or other acute or obtuse angle required in the assembly of the structural member. Further, such members can be manufactured by milling the mating faces and gluing members together with a solvent, structural or hot melt adhesive. Solvent borne adhesives that can act to dissolve or soften thermoplastic present in the structural member and to promote solvent based adhesion or welding of the materials are known in polyvinyl chloride technology. In the welding technique, once the joint surfaces are formed, the surfaces of the joint can be heated to a temperature above the melting point of the composite material and while hot, the mating surfaces can be contacted in a configuration required in the assembled structure. The contacted heated surfaces fuse through an intimate mixing of molten thermoplastic from each surface. Once mixed, the materials cool to form a structural joint having strength typically greater than joinery made with conventional techniques. Any excess thermoplastic melt that is forced from the joint area by pressure in assembling the surfaces can be removed using a heated surface, mechanical routing, or a precision knife cutter.

EXEMPLARY FORMULATIONS

TABLE 3

| Shell PVC composite | |
|---|---|
| Component | Amount wt. % |
| PVC | 50-90 |
| Fiber | 10-50 |
| IM fiber coating | 0.5-2.5 |

TABLE 4

| Core Foaming PVC composition | |
|---|---|
| Component | Parts per hundred |
| Polymer PVC | Basis 100 Parts |
| Process aid | 5-15 |
| Process wax | 2-5 |
| Blowing agent | 1-5 |
| Pigment | 0-6 |
| Density | 0.2-0.4 g-cm$^{-3}$ |

DETAILED DESCRIPTION OF THE DRAWINGS

In FIG. 1, there is shown an isometric view of a core shell member 10. In core shell member 10, there is a foamed core 1 surrounded by a shell member 2. In FIG. 1, the foamed core fully occupies the space formed by the extrusion of an IM coated fiber polymer composite with a relatively thin wall surrounding the core 1. The core shell member is in part optionally covered by a cap stock 3, which provides a decorative layer. Such a layer can mimic a wood grain, a painted surface, or any other surface color profile or other aspect useful in either residential or commercial construction purposes.

In FIG. 2, there is shown an isometric view of a member 11 comprising a multi-core foam core structure 1 surrounded by a shell 2. The shell 2 comprises an IM coated polymer fiber composite. The polymer fiber composite is configured and adapted to the multi-core structure using internal separator structures 4 defining the core foamed structures 1. Similarly, member 11 comprises a cap stock 3.

FIG. 3 provides an end view an end view of a decking profile using the core shell structure. In FIG. 3, there is a decking profile 12 having a core 1, a composite shell 2 wherein the profile includes indentation 5 for the purpose of establishing an appropriate decking profile having both minimal mass but having strength, stiffness, and handling characteristics useful for a deck board.

TABLE 5

| Numerical Indicia in Figures | | |
|---|---|---|
| Numerical Indicium | Element | Discussions |
| 10 | Member | Single foam core |
| 11 | Member | Multi-core foam |
| 12 | Decking profile | Decking utility |
| 1 | Foam | Core foam |
| 2 | Shell | Multi-core foam structure |
| 3 | Cap stock | Decorative layer |
| 4 | Core composite separator | Divides core into multi-cores |
| 5 | Profile | Decking profile |

The claimed technology is illustratively disclosed herein can also be suitably practiced in the absence of any element which is not specifically disclosed herein. The various embodiments described above are provided by way of illustration only and should not be construed to limit the claims attached hereto. Various modifications and changes may be made without following the example embodiments and applications illustrated and described herein, and without departing from the true spirit and scope of the following claims. Consisting essentially of means that additional component(s), composition(s), or method step(s) that do not materially change the basic and novel characteristics of the compositions and methods described herein may be included in those compositions or methods and that all the elements recited must be present, and additional elements may be present provided they are only incidental to function or efficacy. "Consisting of" is a transitional phrase used in a patent claim that excludes any element, step or ingredient not specified in the claim. The claim is subject to avoidance if another element is added.

The specification shows an enabling disclosure of the composite technology, other embodiments may be made with the claimed materials. Accordingly, the invention is embodied solely in the claims hereinafter appended. The specification shows an enabling disclosure of the composite technology, other embodiments may be made with the claimed materials.

I claim:

1. A core shell structural member consisting of:

(i) a shell comprising a polyvinyl chloride fiber composite material, comprising about 10 to 50 wt. % fiber, the balance comprising polyvinyl chloride, the shell having a thickness of about 0.5 to about 3 mm; and (ii) a core comprising of a polyvinyl chloride foam having a foam density of 0.1 to 1 g-cm$^{-3}$, wherein the structural member core has a width of about 5 to 30 centimeters, a thickness about 1 to 3 centimeters, and typically a length of less than about 10 meters; and wherein the member comprises a shell surrounding 3 or more core structures each core structure defined by a separator, each core structure is enclosed by the shell and the K value of the shell is greater than the K value of the foam.

2. The member of claim 1, wherein the polyvinyl chloride fiber composite comprises about 10 to 50 wt. % of a glass fiber and wood fiber, having about 0.5 to 1.5 weight percent of an interfacial modifier, the percentages based on the composite.

3. The member of claim 1, wherein the foam has a closed cell structure, with a spherical foam cell diameter of about 1 to 50 microns.

4. The member of claim 1, wherein the foam has a closed cell structure, with a spherical foam cell diameter of about 10 to 30 microns.

5. The member of claim 1 wherein the member comprises a decorative cap stock.

6. The member of claim 5 wherein the cap stock comprises a wood grain.

7. The member of claim 1 wherein the structural member core has a width of about 10 to 25 centimeters, a thickness about 1 to 2.5 centimeters, the shell has a thickness of about 0.5 to about 3 mm.

8. The member of claim 7 comprising a decking structural member comprising a locus for a fastener used in assembling decking.

9. The member of claim 1, wherein the structural member core has a cross-sectional profile comprising a rectangular profile.

* * * * *